Patented Jan. 3, 1950

2,493,062

UNITED STATES PATENT OFFICE 2,493,062

PROCESS OF DEHYDRATING PEAS

Earl W. Flosdorf, Forest Grove, Pa., assignor to Lyophile-Cryochem Corporation, Baltimore, Md., a corporation of Maryland No Drawing. Application July 5, 1946, Serial No. 681,593

1 Claim. (Cl. 99—199)

This invention relates to improvements in processes for the production of dried peas.

The dried peas produced by the improvements of the invention can be reconstituted simply by the addition of water or by admixing them with water, and, when reconstituted, are the substantial equivalent of fresh green peas. They are not to be confused with the dried peas heretofore avalaible such as split peas.

It has previously been proposed to dry peas by freezing them and removing the water therefrom by sublimation from the frozen state, that is, by the process now commonly referred to as freeze-drying. Such procedures as have been proposed, however, have not resulted in a dried product which can be reconstituted to the substantial equivalent of fresh peas because they have involved the freezing and drying of the peas as a mass and when the peas are so handled and then reconstituted, they do not reconstitute to individual peas of relatively undamaged structure, but on the contrary are substantially broken up or otherwise damaged, with the external layer broken or torn and with the mass as a whole frequently more or less mushy, presumably due to the structural damage incident to the processing procedure followed.

In accordance with the present invention, the peas are dried by the freeze-drying technique, but the frozen peas at the time of freezing and during the drying operation, are prevented from adhering one to the other in the form of a coalesced mass, in other words, are individually dried. Dried peas so obtained retain their individual structural characteristics, and when reconstituted closely resemble fresh peas without the structural damage or change in characteristics incident to the drying of the peas by the processes heretofore proposed.

In accordance with the present invention, fresh green peas are first blanched, and are then frozen and dried. It is important that a least the blanching and freezing operations be carried out within a short time after the peas are picked if a high quality product is to be obtained, and usually the blanching should be carried out within five hours after the peas are picked. The blanched peas are immediately frozen by passing them through or placing them in a freezing zone maintained at a temperature not higher than 10° F., and are frozen over a period up to 2½ hours or whatever time is required to insure thorough freezing of the peas at the selected temperature. The frozen peas, if not inidvidually separate, that is, if they adhere one to the other, are mechanically broken up and are not formed into a compressed mass as is the usual practice in handling frozen peas or in freezing them. During these operations, if they are required, the temperature of the peas is maintained under 20° F.

The frozen peas, individually separate, are then introduced into a vacuum chamber and the pressure in the chamber is reduced to a value below 3.5 mm., heat being supplied by circulating a heating medium through the jacket of the vacuum chamber, through spaces provided in shelves in the chamber, or in other known ways. As a result of the application of a vacuum and the supply of heat the water contained in the frozen peas is removed by sublimation. The rate of supply of heat is adjusted so that the temperature of the peas is maintained below 32° F., usually about 20° F. or lower until nearly all of the water, say 80 to 90% of that originally present in the peas, is removed, after which the temperature of the peas is raised by increase in the rate at which heat is supplied or as a result of the decreased absorption of heat incident to the decreased rate of sublimation of water as the water content of the peas decreases. The temperature is advantageously raised to about 75° F., and the application of the vacuum is continued until the water content of the peas does not exceed 5% and advantageously is less than this, e. g., 1 to 2% or even less.

The dried peas so obtained are stable, and may be kept for long periods of time at ordinary temperatures without deterioration. They may be packaged in ordinary glass jars, or may be hermetically sealed in containers. It is not necessary to use a vacuum or inert gas in storing them. They may be advantageously used as ingredients in dried comestible products, such as dried soups or the like, where, on the addition of water in the usual fashion to the product, they reconstitute to the substantial equivalent of fresh peas.

The general process of freeze drying, which is used in the production of the dried peas in accordance with the present invention is known, and is described in my application Serial No. 549,097, filed August 11, 1944, now abandoned, in the Barr Patent 2,353,986, issued July 18, 1944, in the Flosdorf and Stokes Patent 2,345,548, issued March 28, 1944, in the Reichel Reissue Patent 20,969, reissued January 3, 1939, and the Flosdorf et al. Patent 2,388,134, issued October 30, 1945.

I claim:

The process of producing dried peas which on the addition of water reconstitute to the substantial equivalent of fresh peas which comprises removing water from individually discrete frozen peas by the use of a high vacuum.

EARL W. FLOSDORF.

REFERENCES CITED

The following references are of record in the file of this patent:

UNITED STATES PATENTS

| Number | Name | Date |
|---|---|---|
| 1,979,124 | Tival | Oct. 30, 1934 |
| 2,292,447 | Irwin | Aug. 11, 1942 |
| 2,388,917 | Hormel | Nov. 13, 1945 |
| 2,400,748 | Flosdorf | May 21, 1946 |
| 2,402,673 | Schaffner | June 25, 1946 |

OTHER REFERENCES

"Food Industries" January 1945, pages 92, 93, 94, 95, 168, 170, 172, 174, 176, and 178, article entitled "Drying by Sublimation" by Earl W. Flosdorf.